US012285731B2

(12) United States Patent
Bolden

(10) Patent No.: US 12,285,731 B2
(45) Date of Patent: Apr. 29, 2025

(54) ACOUSTIC MIXING SYSTEM FOR CREATING PROPELLANT MIXTURE

(71) Applicant: UNITED STATES GOVERNMENT AS REPRESENTED BY THE SECRETARY OF THE ARMY, Washington, DC (US)

(72) Inventor: Sarah L Bolden, Redstone Arsenal, AL (US)

(73) Assignee: United States of America, as represented by the Secretary of the Army, Washington, DC (US)

( * ) Notice: Subject to any disclaimer, the term of this patent is extended or adjusted under 35 U.S.C. 154(b) by 1263 days.

(21) Appl. No.: 17/019,569

(22) Filed: Sep. 14, 2020

(65) Prior Publication Data

US 2021/0205770 A1 Jul. 8, 2021

Related U.S. Application Data

(60) Provisional application No. 62/899,247, filed on Sep. 12, 2019.

(51) Int. Cl.
*B01F 31/80* (2022.01)
*B01F 31/86* (2022.01)
*B01F 101/34* (2022.01)

(52) U.S. Cl.
CPC .............. *B01F 31/89* (2022.01); *B01F 31/86* (2022.01); *B01F 2101/34* (2022.01); *B01F 2215/0431* (2013.01); *B01F 2215/0454* (2013.01)

(58) Field of Classification Search
None
See application file for complete search history.

(56) References Cited

U.S. PATENT DOCUMENTS 8,932,417 B1 * 1/2015 Renz ........................ B01F 29/10 149/109.2
9,107,851 B2 8/2015 Dave et al.
9,381,518 B2 7/2016 Leung et al.
10,066,911 B1 * 9/2018 Worrell ...................... F42B 5/16
2010/0294113 A1 * 11/2010 McPherson ......... C06B 21/0025 149/109.6

FOREIGN PATENT DOCUMENTS

EP 3 385 246 A1 10/2018
WO 2012 120071 A1 9/2012
WO WO-2019114930 A1 * 6/2019 ........... C06B 23/006

* cited by examiner

*Primary Examiner* — Aileen B Felton
(74) *Attorney, Agent, or Firm* — Jeremy D. Tillman; Alberto Interian; Michael Gray

(57) ABSTRACT

The present disclosure relates to a method of creating a propellant mixture. The method includes forming an explosive composition mixture, placing the explosive composition mixture into a mixing vessel assembly, and operating an acoustic mixing system at an operating frequency such that the acoustic mixing system causes a vertical displacement of the mixing vessel. The explosive composition mixture has an explosive material, and one or more additives. The mixing vessel assembly has a closed mixing zone having a maximum vertical height. The acoustic mixing system is operated in a manner such that the operating frequency is substantially similar to the resonant frequency and a ratio of the maximum vertical height of the closed mixing zone to the vertical displacement of the mixing vessel assembly is 2.0 or less.

13 Claims, 12 Drawing Sheets

ACOUSTIC MIXING SYSTEM FOR CREATING PROPELLANT MIXTURE

PRIORITY CLAIM

This application claims priority as non-provisional patent application to U.S. Patent Provisional Application No. 62/899,247, filed Sep. 12, 2019, the disclosure of which is incorporated by reference herein in its entirety.

DEDICATORY CLAUSE

The subject matter of the present application described herein may be manufactured, used and licensed by or for the United States Government for governmental purposes without the payment of any royalties.

FIELD

The present disclosure generally relates to an acoustic mixing system for creating propellant mixture, and more specifically, to an acoustic mixing system for creating propellant mixture using an acoustic mixing process.

BACKGROUND

Acoustic mixing technology operates on the principle of resonance, in which low frequency acoustic energy creates a uniform shear field within a mixing vessel. An acoustic mixing system operates at a frequency substantially similar to a resonant frequency of the mixing system. This results in acoustic energy being directly transferred to a mixture located within the mixing vessel, resulting in significant forces (e.g., up to 200 g's) to be transferred to the mixture. Consequently, the acoustic mixing system results in a homogenous mixture made up of at least two different materials without the use of impellers or other additional mixing aids.

Acoustic mixing technology allows for the rapid, uniform dispersion of at least two different materials, decreasing processing time and waste associated with creating propellant mixtures. However, acoustic mixing technology works best with two or more materials having disparate densities. This creates an issue when mixing certain propellant mixtures that have two or more materials with closely matched densities. For example, mixtures including nitrocellulose have proven to be challenging to mix using acoustic mixing technology. Nitrocellulose is a compound that has an inherently fibrous nature. Consequently, when mixtures containing nitrocellulose are mixed using acoustic energy, the nitrocellulose absorbs the acoustic energy instead of working the nitrocellulose into other materials (e.g., plasticizer) to form a homogenous mixture.

Other mixing technologies (such as those described in U.S. Pat. No. 2,510,834—the disclosure of which is incorporated by reference herein in its entirety) have been used to mix propellant mixtures containing nitrocellulose. These other technologies include, for example, a water-slurry process that takes hours to process. Using this process, nitrocellulose is slurried with an anti-solvent while a plasticizer is slowly dripped into the slurry. Due to the chemical nature of the plasticizer and the anti-solvent, the slow dripping of the plasticizer into the slurry results in the plasticizer incorporating into the nitrocellulose. The propellant mixture is then subsequently filtered for further processing. In addition to long processing time, using the water-slurry process requires the propellant mixture to be done in a batch-process, which presents certain challenges as production levels increase. Also, the water-slurry process creates a lot of wastewater contaminated with nitrate esters. While wastewater can be minimized by re-using water for multiple batches, the wastewater does ultimately need to be treated and disposed of properly at the end of a manufacturing run.

Therefore, described herein is a system for creating propellant mixtures using an acoustic mixing process is needed. A new system would enable propellant mixtures having two or more materials with closely matched densities to be mixed, eliminating the need to use other mixing technologies with shortcomings such as wastewater and/or long processing times.

BRIEF SUMMARY

This summary is provided to introduce a selection of concepts that are further described below in the detailed description. This summary is not intended to identify indispensable features of the claimed subject matter, nor is it intended for use as an aid in limiting the scope of the claimed subject matter. In one embodiment, the present disclosure provides a method of creating a propellant mixture.

The present disclosure introduces a method of forming an explosive composition mixture, placing the explosive composition mixture into a mixing vessel assembly, and operating an acoustic mixing system at an operating frequency such that the acoustic mixing system causes a vertical displacement of the mixing vessel assembly. The explosive composition mixture includes an explosive material and one or more additives. The mixing vessel assembly includes an upper dish and a lower dish, with the upper and lower dishes collectively forming a closed mixing zone having a maximum vertical height. The acoustic mixing system has a resonant frequency. The resonant frequency is constant when the acoustic mixing system is at rest and varying when the acoustic mixing system is in operation. The acoustic mixing system is operated in a manner such that the operating frequency is substantially similar to the resonant frequency and a ratio of the maximum vertical height of the closed mixing zone to the vertical displacement of the mixing vessel assembly is 2.0 or less.

BRIEF DESCRIPTION OF THE DRAWINGS

For a better understanding of the nature and objects of the disclosure, reference should be made to the following detailed description taken in conjunction with the accompanying drawings, in which.

Figure 1:
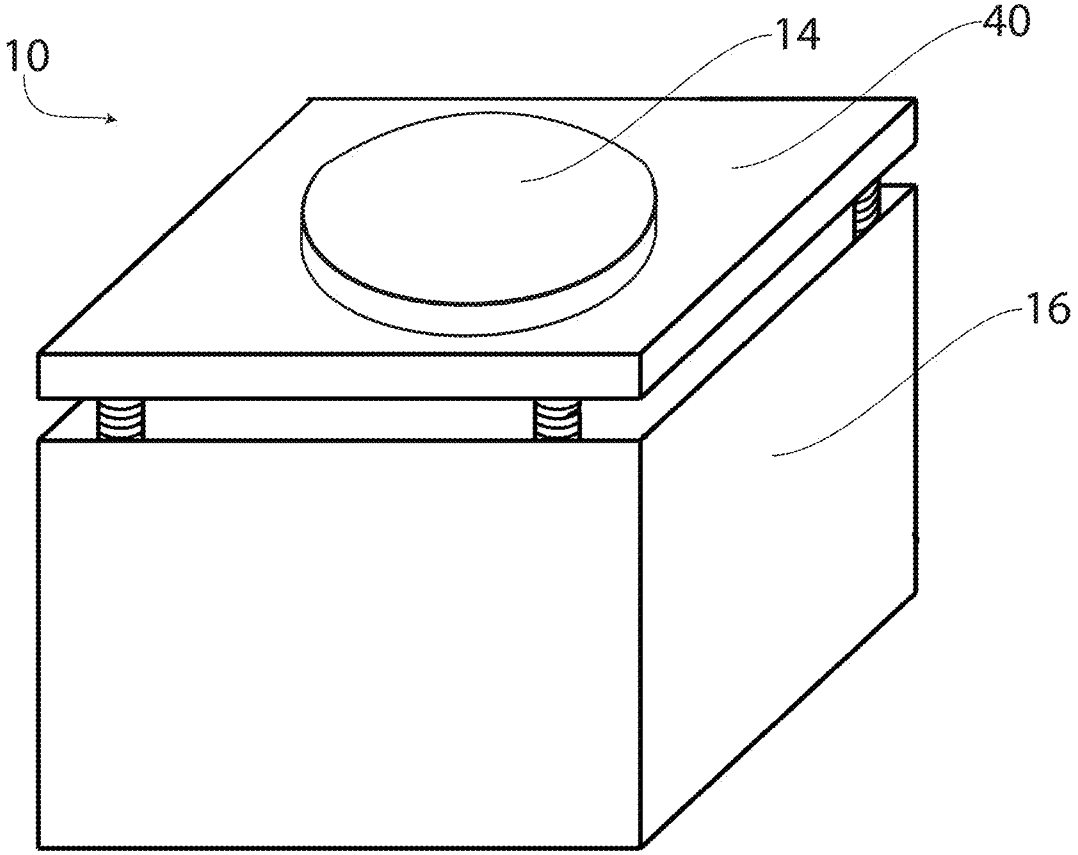
FIG. 1 is a perspective view of an acoustic mixing system in accordance with the present disclosure, the acoustic mixing system having an acoustic mixer and a mixing vessel assembly, the mixing vessel assembly containing an explosive composition mixture.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible. At the outset, it should be noted that in the development of any such actual embodiment, numerous implementation—specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The present disclosure provides an acoustic mixing system 10 for creating propellant mixture via an acoustic mixing process. The acoustic mixing system 10 includes an explosive composition mixture 12, a mixing vessel assembly 14, and an acoustic mixer 16. FIG. 1 shows a schematic drawing of the acoustic mixing system 10, with the explosive composition mixture 12 being located within the mixing vessel assembly 14 that is positioned on the acoustic mixer 16.

Figure 2:
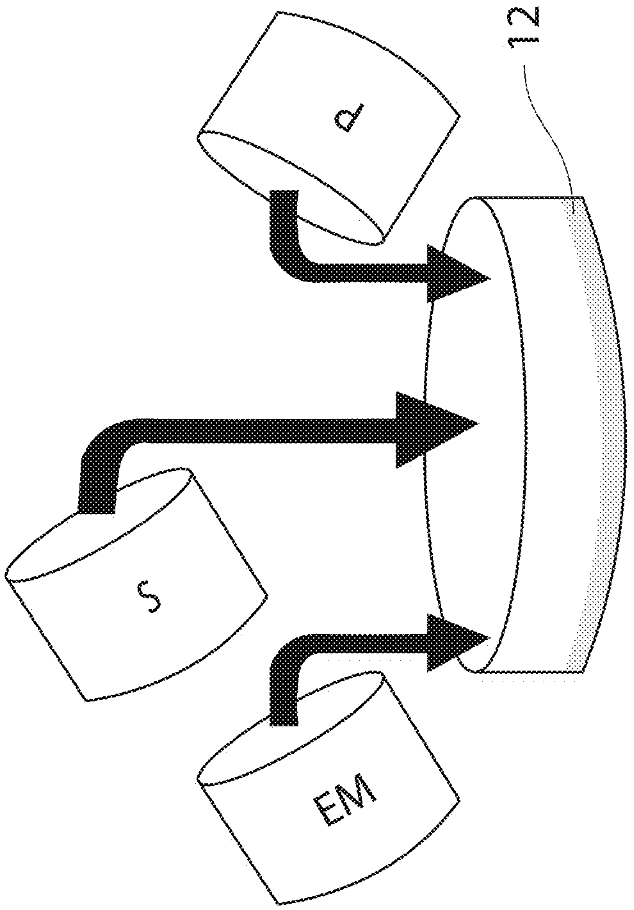
FIG. 2 is a schematic drawing showing an additive, a plasticizer, and an explosive material being placed into a mixing vessel.
Figure 3:
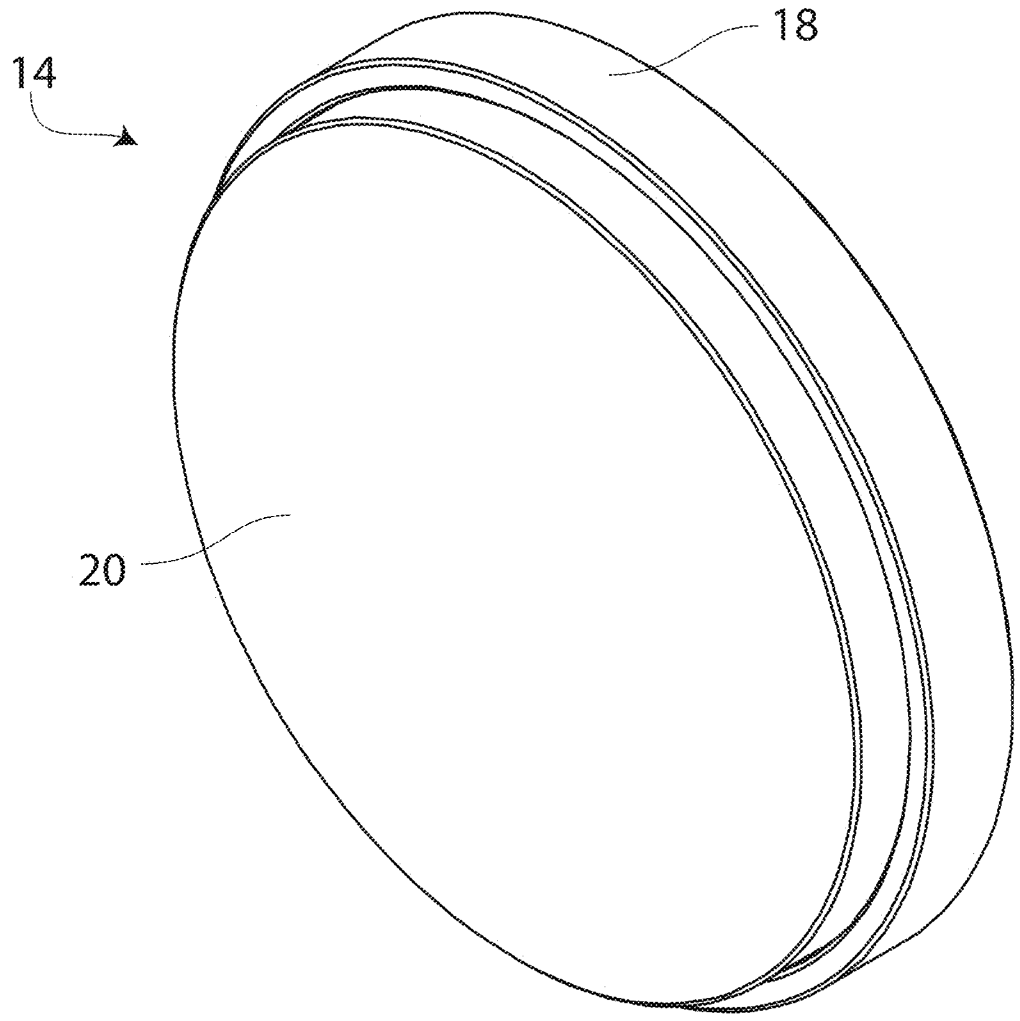
FIG. 3 is a perspective view of a mixing vessel assembly in accordance with the present disclosure.
Figure 4:
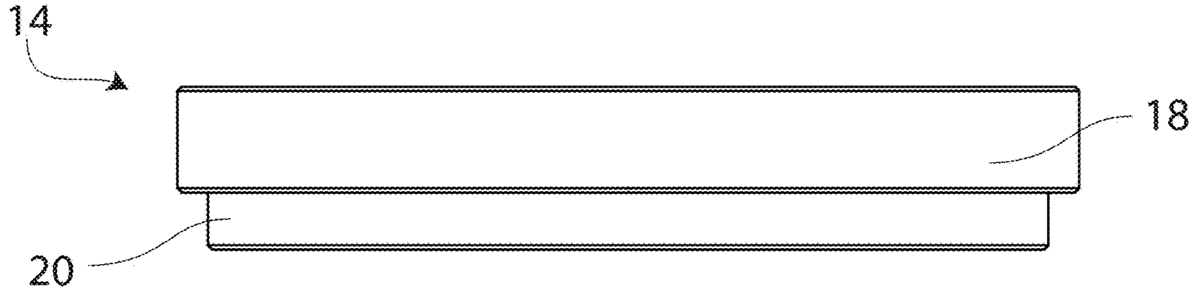
FIG. 4 is a right side view of the mixing vessel assembly shown in FIG. 3, the left side view being a mirror image thereof.
Figure 5:
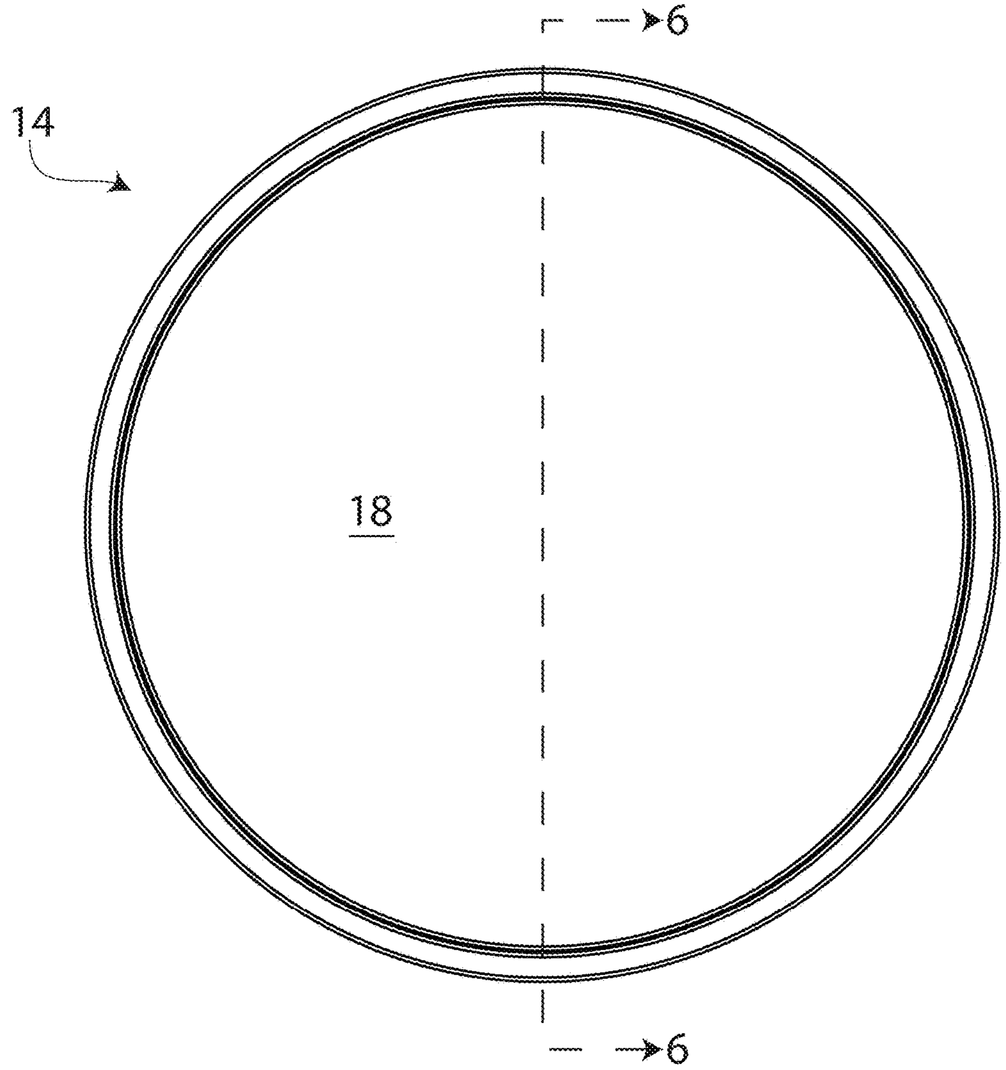
FIG. 5 is a top view of the mixing vessel assembly shown in FIGS. 3-4.

In a first embodiment, the explosive composition mixture 12 includes an explosive material (EM), and one or more additives. In a specific embodiment, as shown in FIG. 2, the explosive composition mixture 12 includes an explosive material EM, a stabilizer S, and a plasticizer P.

Examples of suitable explosive materials (also referred to herein as "low-bulk density fibrous materials) include nitrocellulose, cellulose, Kevlar, and combinations thereof. The explosive material may be present in the explosive material composition mixture in an amount of from about 0.1% to about 95% by weight, from about 20% to about 80% by weight, and from about 30 to about 70% by weight.

As discussed above, the explosive composition mixture 12 may also include one or more additives. Examples of additives include plasticizers, stabilizers, burn-rate modifiers, lubricants, flow agents, curatives, binders, bonding agents, fuels, oxidizers, emulsifiers, colorants, dispersants, antioxidants, and preservatives. The one or more additives may be present, individually or in combination, in the explosive material composition mixture in an amount of from about 5% to about 99.9%, from about 20% to about 80%, and from about 30% to about 70%

Examples of stabilizers include phenylamines such as 2-nitrodiphenylamine (2-NDPA) or 4-nitrodiphenylamine (4-NDPA), anilines such as mononitroaniline, phenolics such as resorcinol, and phenylureas such as ethyl centralite. The stabilizers may be present in the explosive material composition mixture in an amount of from about 0% to about 30% from about 0.1% to about 15%, and from about 0.5% to about 5%.

Examples of plasticizers include isophorones such as 4-oxo-isophorone, terpenes such as laevo-carvone (1-carvone), nitrate esters such as nitroglycerin, adipates such as dioctyl adipate, and mellitates such as trioctyl mellitate. The one or more additives may be present in the explosive material composition mixture in an amount of from about 5% to about 99.9%, from about 20% to about 80%, and from about 30% to about 70%.

More specifically, in the first embodiment, the explosive composition mixture 12 consists of 32 g 25% water-wet 13.3% N nitrocellulose, 0.40 g 2-NDPA, and 15.6 g 4-oxo-isophorone (hereinafter, referred to as Mixture #1 throughout this disclosure). In second embodiment, the explosive material is nitrocellulose, the stabilizer is 2-Nitrodiphenylamine (2-NDPA), and the plasticizer is laevo-carvone (1-carvone). More specifically, in the second embodiment, the explosive composition mixture 12 consists of 15 g water-wet 12.6% N nitrocellulose, 0.25 g 2-NDPA, and 7.5 g 1-carvone (hereinafter, referred to as Mixture #2 throughout this disclosure). In an alternative embodiment, the explosive composition mixture 12 consists of 32 g water-wet 12.6% N nitrocellulose, 0.4 g 2-NDPA, and 15.6 g 1-carvone (hereinafter, referred to as Mixture #3 throughout this disclosure). A person of ordinary skill in the art will understand that an explosive material EM other than nitrocellulose could be used in the explosive composition mixture 12 in accordance with the present disclosure. Similarly, a person of ordinary skill in the art will further understand that the additive other than 4-oxo-isophorone and 1-carvone could be used in the explosive composition mixture 12 in accordance with the present disclosure, such as, for example, nitroglycerin.

The explosive composition mixture 12 can be formed in the mixing vessel assembly 14, as shown in FIG. 2. Alternatively, a person of ordinary skill in the art will understand that the explosive composition mixture 12 could be formed in an alternative vessel and subsequently transferred to the mixing vessel assembly 14.

FIGS. 3-9 show the mixing vessel assembly 14. The mixing vessel assembly 14 comprises an upper dish 18, a lower dish 20, and a seal 22, as shown in cross-sectional FIGS. 6 and 7. When the mixing vessel assembly 14 is assembled, the upper dish 18 and the lower dish 20 sandwich the seal 22 and collectively define a closed mixing zone 24 having a maximum vertical height 26. More specifically, an interior surface 28 of the upper dish 18 and an interior surface 29 of the lower dish 20 collectively define the closed mixing zone 24. The seal 22 (e.g., an O-ring) ensures that the explosive composition mixture 12 located within the closed mixing zone 24 does not escape during the acoustic mixing process.

Figure 7:
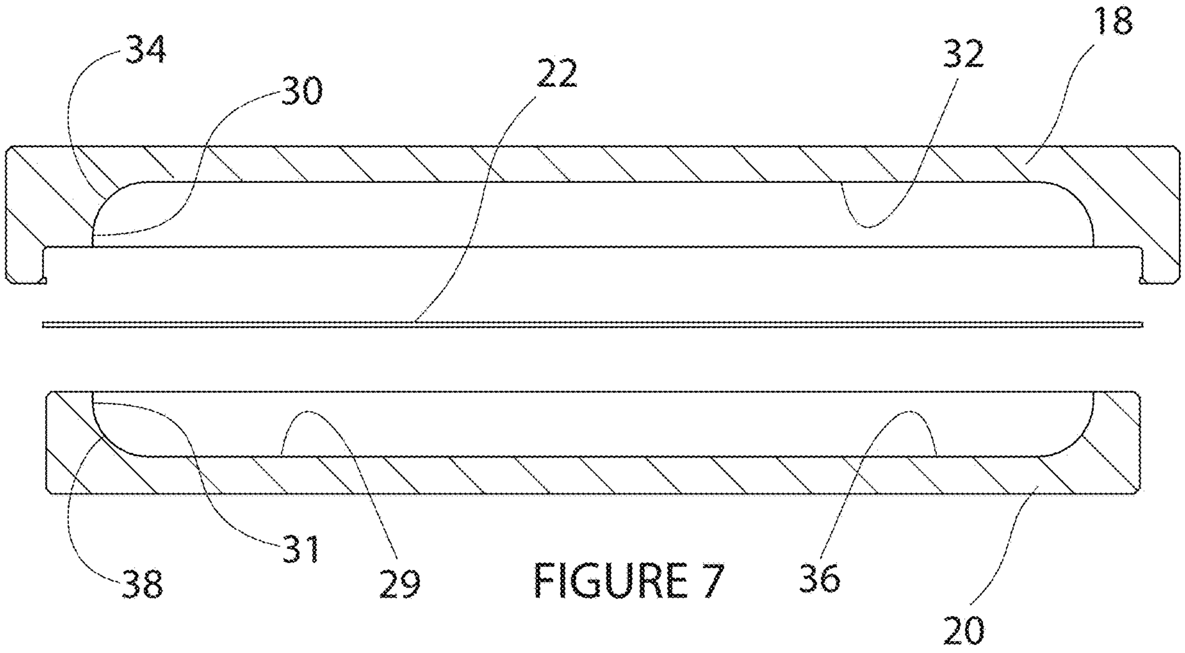
FIG. 7 is an exploded view of the cross-section view shown in FIG. 6.
Figure 8:
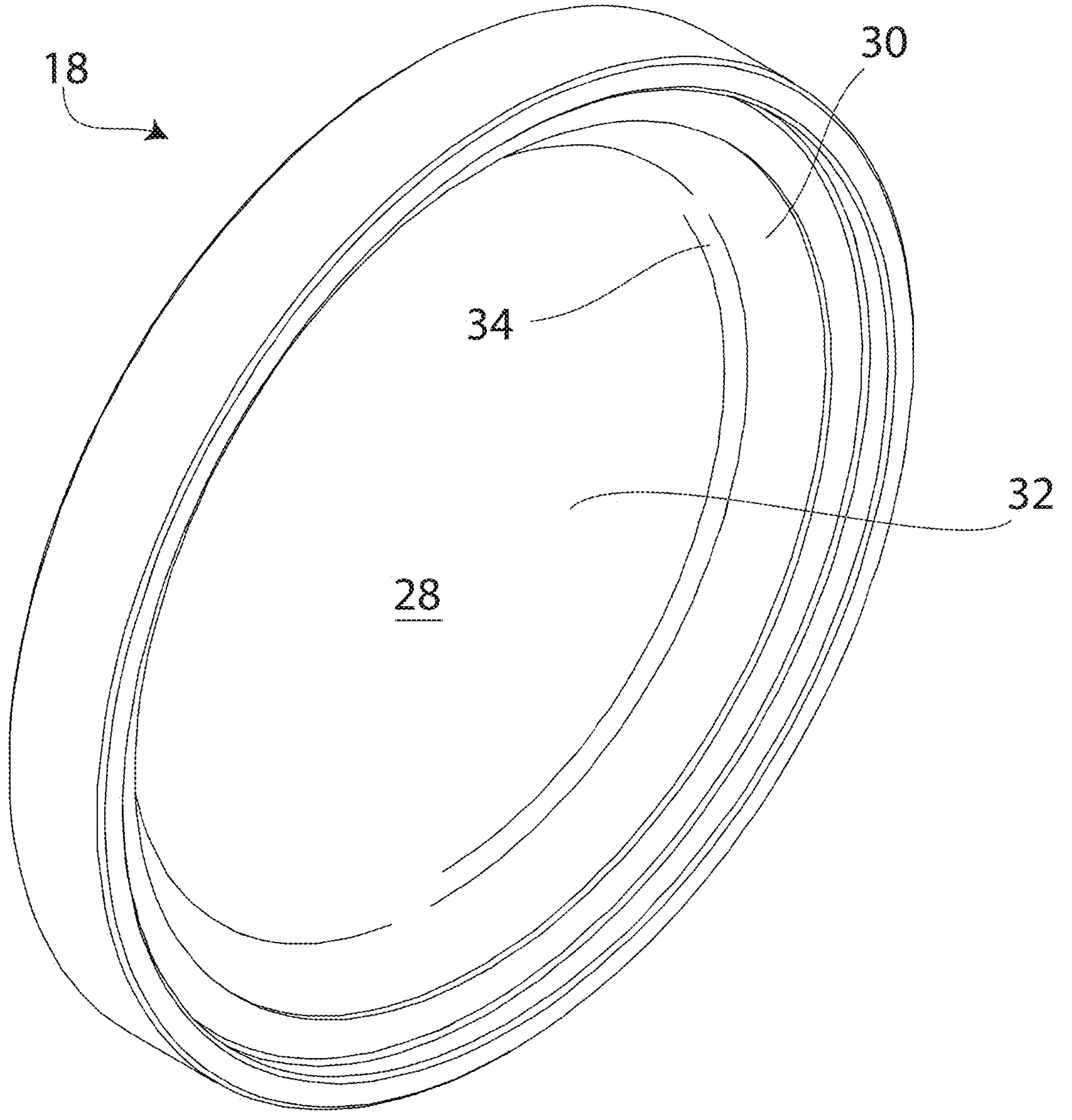
FIG. 8 is a perspective view of an upper dish of the mixing vessel assembly shown in FIGS. 3-6.
Figure 10:
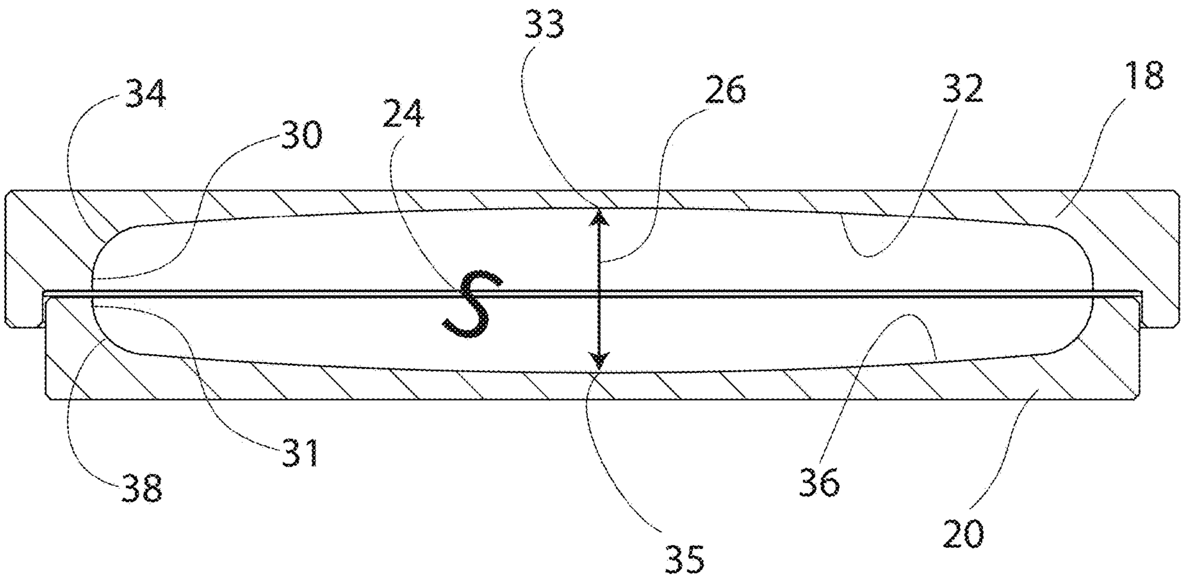
FIG. 10 is a cross-sectional view of an alternative embodiment of a mixing vessel assembly.

The upper dish 18 is shown in FIG. 8. The interior surface 28 of the upper dish 18 has a sidewall region 30, an upper region 32, and a transition region 34 where the sidewall region transitions to the upper region. In an embodiment, the transition region 34 of the upper dish 18 is curved (as best seen in FIG. 7) rather than forming a sharp edge. The curved transition region 34 promotes mixing of the explosive composition mixture 12 during the acoustic mixing process, preventing portions of the explosive composition mixture from being conglomerated in sharp edges and/or corners of the upper dish 18. A person of ordinary skill in the art will understand that the upper dish 18 can be machined as a unitary, one-piece member having a curved transition region 34, as shown in FIG. 8. A person of ordinary skill in the art will further understand that the upper region 32 could be substantially planar, as shown in FIG. 6-8, or non-planar, as shown in FIG. 10.

Figure 9:
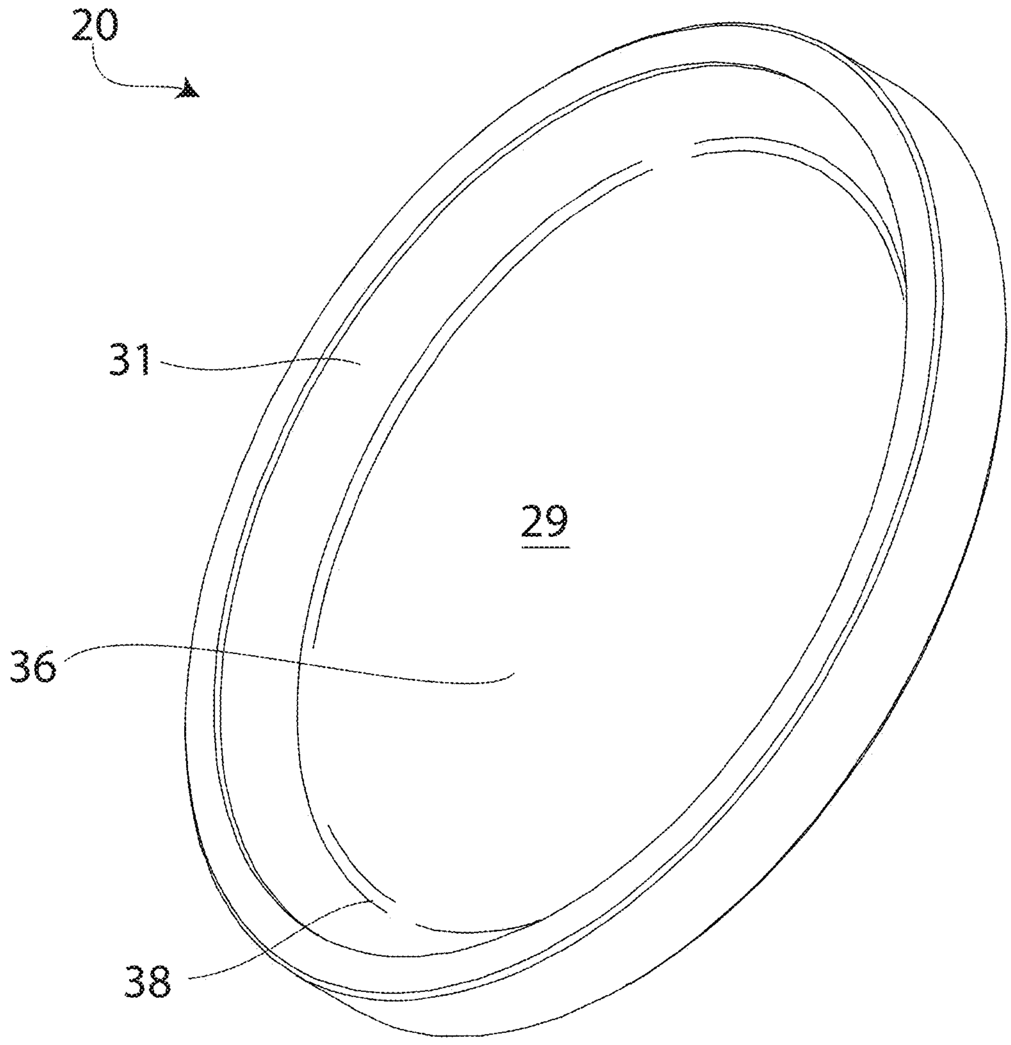
FIG. 9 is a perspective view of a lower dish of the mixing vessel assembly shown in FIGS. 3-6.

The lower dish 20 is shown in FIG. 9. The interior surface 29 of the lower dish 20 has a sidewall region 31, a lower region 36, and a transition region 38 where the sidewall region transitions to the lower region. In an embodiment, the lower dish 20 is designed such that the transition region 38 is curved (as best seen in FIG. 7) rather than forming a sharp edge. The curved transition region 38 promotes mixing of the explosive composition mixture 12 during the acoustic mixing process, preventing portions of the explosive composition mixture 12 from being conglomerated in sharp edges and/or corners of the lower dish 20. A person of ordinary skill in the art will understand that the lower dish 20 could be machined as a unitary, one-piece member having a curved transition region 38, as shown in FIG. 9. A person of ordinary skill in the art will further understand that the lower region 36 could be substantially planar, as shown in FIGS. 6, 7, and 9, or curved, as shown in FIG. 10.

Figure 6:
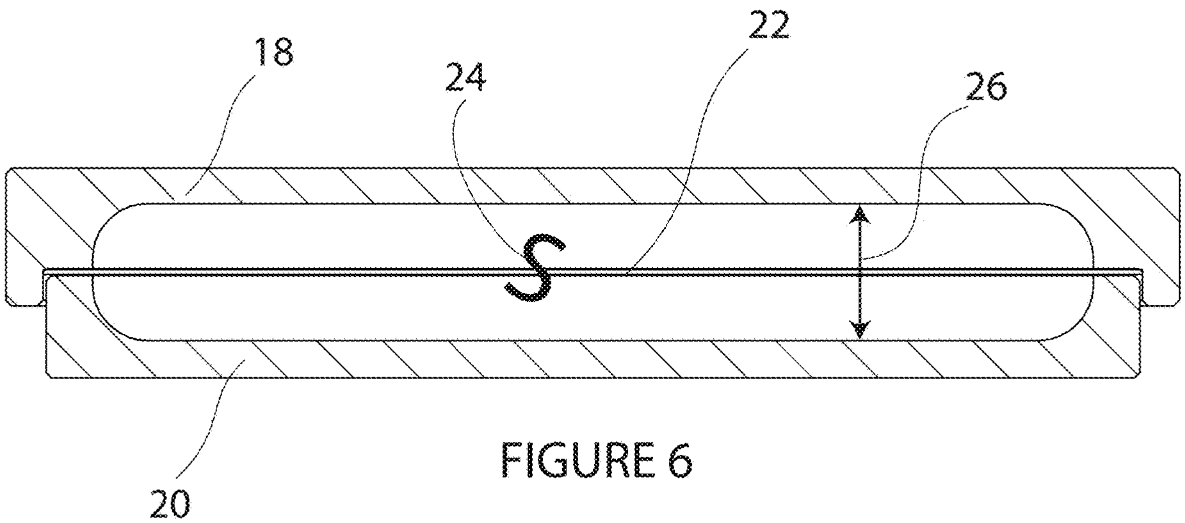
FIG. 6 is a cross-sectional view of the mixing vessel assembly shown in FIGS. 3-5, the cross-section being taken along line 6-6 shown in FIG. 5.

Accordingly, the upper dish 18 and the lower dish 20 are designed such that when the mixing vessel assembly 14 is assembled, as shown in FIG. 6, the closed mixing zone 24 is edgeless (i.e., lacking sharp edges). The maximum vertical height 26 of the mixing vessel assembly 14 extends from the upper region 32 of the upper dish 18 to the lower region 36 of the lower dish 20. In the alternative embodiment shown in FIG. 10, the maximum vertical height 26 for the closed mixing zone 24 extends from an apex 33 of the upper region 32 of the upper dish 18 to an apex 35 of the lower region 36 of the lower dish 20.

After placing the explosive composition mixture 12 into one or both of the lower dish 20 and the upper dish 18, the mixing vessel assembly 14 is assembled to form a closed mixing zone 24. In an alternative embodiment, a plurality of filler beads can also be placed into the mixing vessel assembly. A person of ordinary skill in the art will understand that the filler beads can be either plastic or glass. The filler beads may assist in breaking up any conglomerates of the explosive composition mixture 12 formed in the mixing vessel assembly 14 formed during the mixing process.

Figure 11:
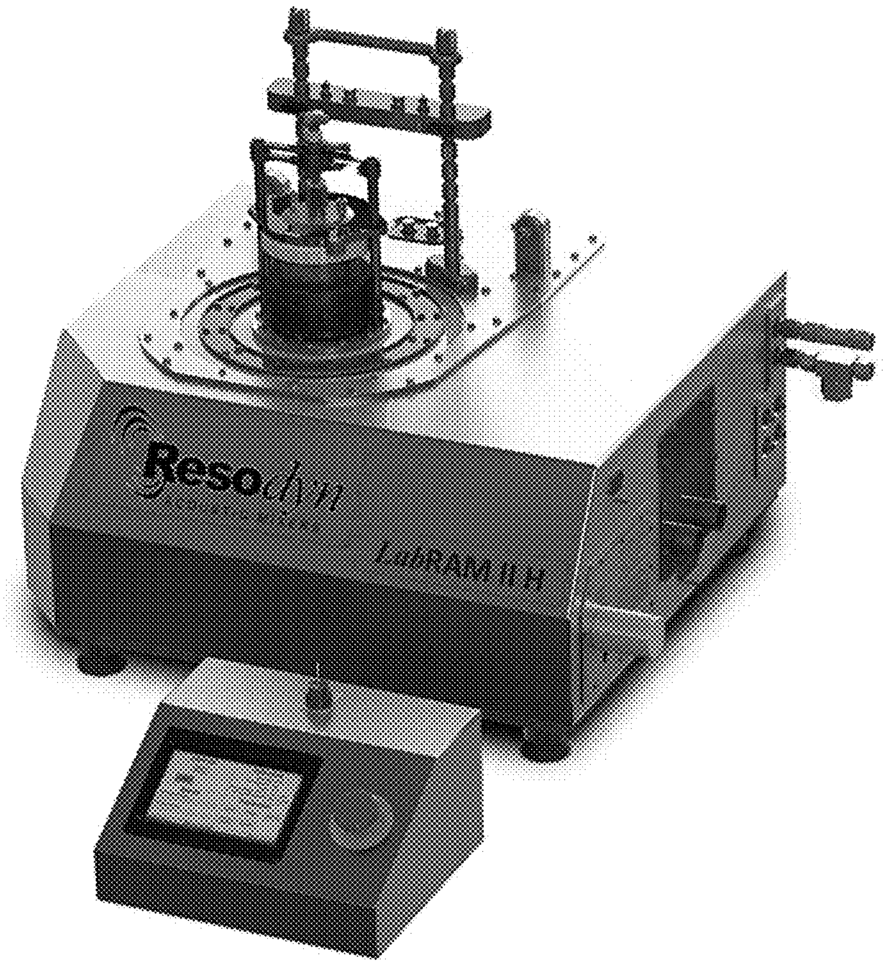
FIG. 11 is a photo of a LABRAM mixer.

As illustrated by FIG. 1, the mixing vessel assembly 14 is then placed into or onto a plate 40 of an acoustic mixer 16, thereby forming the acoustic mixing system 10. Examples of commercially available acoustic mixers include a LABRAM mixer and a RESONANT ACOUSTIC mixer, both of which are commercially available from Resodyn Acoustic Mixers, Inc. An example of a LABRAM mixer is shown in FIG. 11. Acoustic mixers are operated on a resonant frequency. A closely controlled electromechanical oscillator is used to excite the explosive composition mixture 12 located in the mixing vessel assembly 14 positioned on the plate 40. The acoustic mixer 16 may operate at a frequency of from about 3 Hertz (Hz) to about 300 Hz, from about 30 Hz to about 100 Hz, from about 60 Hz to about 65 Hz, from about 4 Hz to about 250 Hz, from about 5 Hz to about 200 Hz.

As with all physical objects, the acoustic mixing system 10 has a resonant frequency. The resonant frequency of the acoustic mixing system 10 is constant when at rest but is continually adjusting and changing when the acoustic mixer 16 is in operation. In one embodiment, the resonant frequency of the acoustic mixing system 10 is greater than about 20 Hz and less than about 100 Hz. More specifically, the resonant frequency of the acoustic mixing system 10 is greater than about 50 Hz and less than about 70 Hz. Even more specifically, the resonant frequency of the acoustic mixing system 10 is greater than about 58 Hz and less than about 62 Hz.

In accordance with a method of the present disclosure, the acoustic mixing system 10 is operated at an operating frequency that causes a vertical displacement of the mixing vessel assembly 14. In one embodiment, the vertical displacement of the mixing vessel assembly 14 is equal to or less than 14 mm (0.55 inches). Notably, the acoustic mixing system 10 is designed and operated such that a ratio of the maximum vertical height 26 of the closed mixing zone 24 to the vertical displacement of the mixing vessel assembly 14 is 2.0 or less, 1.5 or less or 1.0 or less. The ratio of the maximum vertical height 26 of the closed mixing zone 24 to the vertical displacement of the mixing vessel assembly 14 within the acoustic mixing system 10 ensures the explosive composition mixture 12 located within the mixing vessel assembly experiences a majority of the forces associated with the vertical displacement, thereby generating intense mixing of the explosive composition mixture 12 to create a homogenous mixture.

EXAMPLES

The following examples set forth methods in accordance with the present disclosure. It is to be understood, however, that these examples are provided by way of illustration and noting therein should be taken as a limitation upon the overall scope of any claims. For each of the below examples, the maximum vertical height of the closed mixing zone to the vertical displacement of the vessel was 1.4

Example #1-Mixture #1

This example describes a method for using an acoustic mixer 16, such as a LABRAM mixer similar to the image shown in FIG. 11, to mix an explosive composition mixture 12, such as Mixture #1 described above. The explosive composition mixture 12 was formed and placed into the mixing vessel assembly 14. For this example, the upper dish 18 did not include a transition region 34 and the lower dish 20 did not include a transition region 38. Instead, the upper dish 18 has a sharp edge (i.e., corner) where the sidewall region 30 and the upper region 32 intersect and the lower dish 20 has a sharp edge (i.e., corner) where the sidewall region 31 and the lower region 36 intersect.

Figure 12A:
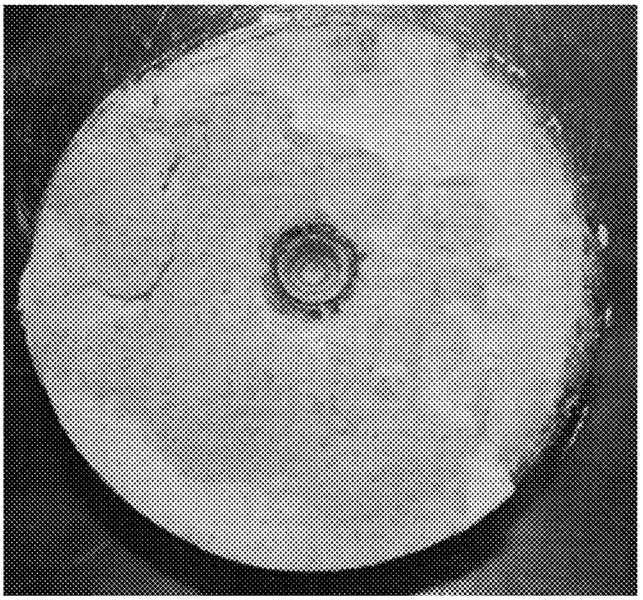
FIG. 12*a* is a photo of an upper dish after performing an acoustic mixing process in accordance with the present disclosure.
Figure 12B:
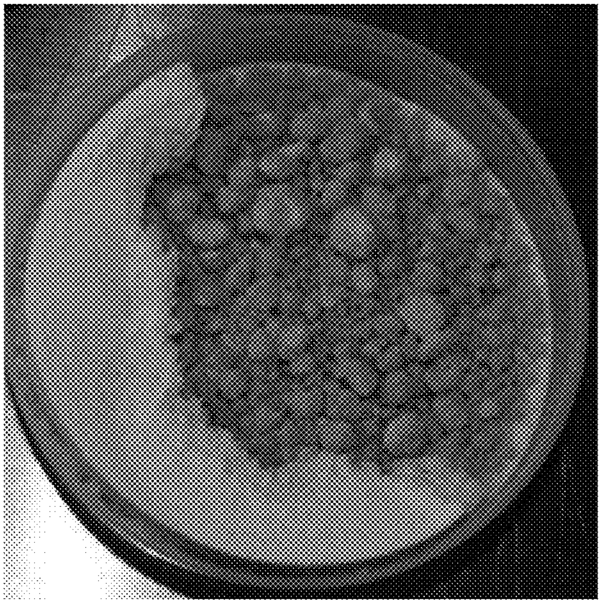
FIG. 12*b* is a photo of a lower dish after performing an acoustic mixing process in accordance with the present disclosure.

The mixing vessel assembly 14 was placed onto the acoustic mixer 16, and the acoustic mixer was operated at an operating frequency greater than 58 Hz and less than 62 Hz. This resulted in a vertical displacement of the mixing vessel assembly 14 equal to or less than 14 mm. The acoustic mixer 16 was operated for a total of approximately 8 minutes. The photo shown in FIG. 12*a* shows the upper dish 18 after the mixing process, and the photo shown in FIG. 12*b* shows the lower dish 20 after the mixing process.

Example #2-Mixture #2

This example describes a method for using an acoustic mixer 16, such as a LABRAM mixer similar to the image shown in FIG. 11, to mix an explosive composition mixture 12, such as Mixture #2 described above. The explosive composition mixture 12 was formed and placed into the mixing vessel assembly 14. For this example, the upper dish 18 did not include a transition region 34 and the lower dish 20 did not include a transition region 38. Instead, the upper dish 18 has a sharp edge (i.e., corner) where the sidewall region 30 and the upper region 32 intersect and the lower dish 20 has a sharp edge (i.e., corner) where the sidewall region 31 and the lower region 36 intersect.

Figure 13A:
FIG. 13*a* is photo of a lower dish and an upper dish after performing an acoustic mixing process in accordance with the present disclosure.
Figure 13B:
FIG. 13*b* is a photo of the lower dish and upper dish after scraping-down any conglomerated material in accordance with the present disclosure.

The mixing vessel assembly 14 was placed onto the acoustic mixer 16, and the acoustic mixer was operated at an operating frequency greater than 58 Hz and less than 62 Hz. This resulted in a vertical displacement of the mixing vessel assembly 14 equal to or less than 14 mm. The acoustic mixer 16 was operated for a total of approximately 2 minutes. The photo shown in FIG. 13*a* shows the lower dish 20 after the mixing process was completed but before a technician used a spatula to scrape-down any conglomerated material. The photo shown in FIG. 13*b* shows the lower dish 20 after the technician used the spatula to scrape-down any conglomerated material.

Example #3-Mixture #3

This example describes a method for using an acoustic mixer 16, such as a LABRAM mixer similar to the image shown in FIG. 11, to mix an explosive composition mixture 12, such as Mixture #3 described above. The explosive composition mixture 12 was formed and placed into the mixing vessel assembly 14. For this example, the upper dish 18 did not include a transition region 34 and the lower dish 20 did not include a transition region 38. Instead, the upper dish 18 has a sharp edge (i.e., corner) where the sidewall region 30 and the upper region 32 intersect and the lower dish 20 has a sharp edge (i.e., corner) where the sidewall region 31 and the lower region 36 intersect.

Figure 14A:
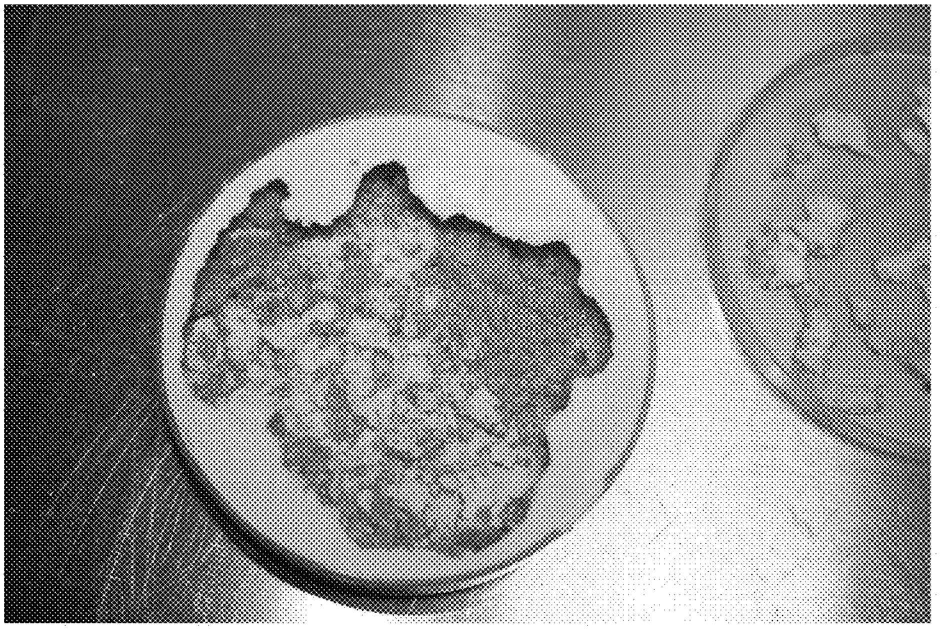
FIG. 14*a* is photo of a lower dish and an upper dish after performing an acoustic mixing process in accordance with the present disclosure.
Figure 14B:
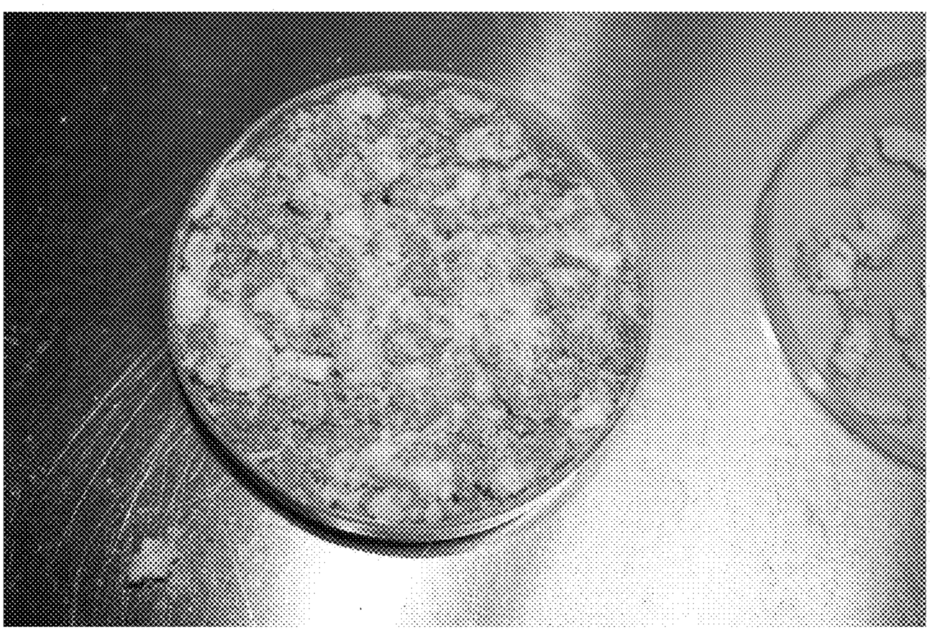
FIG. 14*b* is a photo of the lower dish and upper dish after scraping-down any conglomerated material in accordance with the present disclosure.

The mixing vessel assembly 14 was placed onto the acoustic mixer 16, and the acoustic mixer was operated at an operating frequency greater than 58 Hz and less than 62 Hz. This resulted in a vertical displacement of the mixing vessel assembly 14 equal to or less than 14 mm. The acoustic mixer 16 was operated for a total of approximately 13 minutes. The photo shown in FIG. 14*a* shows the lower dish 20 after the mixing process was completed but before a spatula to scrape-down any conglomerated material. The photo shown in FIG. 14*b* shows the lower dish 20 after the technician used the spatula to scrape-down any conglomerated material.

The foregoing description has been presented for the purposes of illustration and description. It is not intended to be exhaustive or to limit the disclosure to the precise form disclosed. Many modifications and variations are possible in light of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

A person of ordinary skill in the art would understand that the disclosed acoustic mixing system and corresponding method could be used with other low-bulk density fibrous materials other than nitrocellulose. For example, a person of ordinary skill in the art would understand that the acoustic mixing system and corresponding method disclosed herein could be used to mix cellulose and/or Kevlar. A person of ordinary skill in the art would further understand that additives other than plasticizers and/or stabilizers may be used in forming a mixture. In view of the foregoing, a person of ordinary skill in the art would understand that the disclosed acoustic mixing system and corresponding method could be used for forming mixtures other than propellant mixtures.

Further, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

What is claimed is:

1. A method of creating a propellant mixture, the method comprising:

forming an explosive composition mixture, the explosive composition mixture comprising an explosive material, and one or more additives, placing the explosive composition mixture into a mixing vessel assembly, the mixing vessel assembly comprising an upper dish and a lower dish, the upper and lower dishes collectively forming a closed mixing zone having a maximum vertical height;

operating an acoustic mixing system at an operating frequency such that the acoustic mixing system causes a vertical displacement of the mixing vessel, the acoustic mixing system having a resonant frequency, the resonant frequency being constant when the acoustic mixing system is at rest and varying when the acoustic mixing system is in operation;

wherein the acoustic mixing system is operated in a manner such that the operating frequency is substantially similar to the resonant frequency and a ratio of the maximum vertical height of the closed mixing zone to the vertical displacement of the mixing vessel assembly is 2.0 or less, and wherein the acoustic mixing system is operated in a manner such that the operating frequency is greater than 20 Hz and less than 100 Hz.

2. The method of claim 1, wherein the explosive material is nitrocellulose.

3. The method of claim 1, wherein the one or more additives comprises a plasticizer and a stabilizer.

4. The method of claim 3, wherein the stabilizer is 2-Nitrodiphenylamine.

5. The method of claim 3, wherein the plasticizer is 4-oxo-isophorone.

6. The method of claim 3, where in the plasticizer is laevo-carvone.

7. The method of claim 1, wherein the acoustic mixing system is operated in a manner such that the vertical displacement of the mixing vessel is equal to or less than 0.55 inches.

8. The method of claim 1, wherein the acoustic mixing system is operated in a manner such that the operating frequency is greater than 50 Hz and less than 70 Hz.

9. The method of claim 8, wherein the acoustic mixing system is operated in a manner such that the operating frequency is greater than 58 Hz and less than 62 Hz.

10. The method of claim 1, wherein the explosive composition mixture consists essentially of an explosive material, a stabilizer, and a plasticizer.

11. The method of claim 10, wherein the explosive material is nitrocellulose and the stabilizer is 2-Nitrodiphenylamine.

12. The method of claim 1, wherein the upper dish does not include a transition region.

13. The method of claim 1, wherein the lower dish does not include a transition region.

* * * * *